United States Patent [19]

Koshiishi

[11] Patent Number: 5,063,590

[45] Date of Patent: Nov. 5, 1991

[54] ACOUSTIC COUPLER AND DATA TRANSMISSION APPARATUS USING THE SAME

[75] Inventor: Takaho Koshiishi, Tokyo, Japan

[73] Assignee: Ricoh Company, Ltd., Tokyo, Japan

[21] Appl. No.: 543,481

[22] Filed: Jun. 26, 1990

[30] Foreign Application Priority Data

Jun. 29, 1989 [JP] Japan .................................. 1-75558
Dec. 15, 1989 [JP] Japan .................................. 1-144165

[51] Int. Cl.$^5$ ........................................... H04M 11/00
[52] U.S. Cl. ..................................... 379/99; 379/444; 455/89
[58] Field of Search .................. 358/400; 379/444, 90, 379/99, 100, 440–442; 455/89, 90

[56] References Cited

U.S. PATENT DOCUMENTS

| | | | |
|---|---|---|---|
| 3,496,298 | 2/1970 | Crookshanks et al. | 379/100 |
| 3,553,374 | 1/1971 | Wolf et al. | 379/443 |
| 3,882,277 | 5/1975 | Depedro et al. | 379/99 |

FOREIGN PATENT DOCUMENTS

| | | | |
|---|---|---|---|
| 2040306 | 2/1972 | Fed. Rep. of Germany . | |
| 0036651 | 2/1990 | Japan | 379/440 |
| 0620695 | 3/1949 | United Kingdom | 379/444 |

OTHER PUBLICATIONS

Füllmann, René: Elf Akustikkopplern aufs Bit geschaut in: Elo 9/1985, pp. 68–75.

*Primary Examiner*—James L. Dwyer
*Assistant Examiner*—Wing F. Chan
*Attorney, Agent, or Firm*—Oblon, Spivak, McClelland, Maier & Neustadt

[57] ABSTRACT

An acoustic coupler for a data communication device with a housing having a receiver and a coupling member mechanically coupling the receive housing and the transmitter housing. The acoustic coupler also includes a first microphone as part of the receiver for receiving an acoustic signal from a transmitter portion of a handset of a telephone, when the acoustic coupler is set to the handset. A first speaker is fastened to the second end of the receive part and outputting an acoustic signal to an operator, with yet a second speaker being fastened receiver portion of the housing for outputting an acoustic signal to a receiver portion of the handset. A second microphone is fastened to another part of the receiver which is for inputting an acoustic signal from the operator, and a coupling circuit for electrically coupling the first microphone, the second microphone, the first speaker and the second speaker to a data transmission apparatus. This arrangement allows for a more reliable connection of a data transmission device to the communication medium, be it radio or wired.

31 Claims, 10 Drawing Sheets

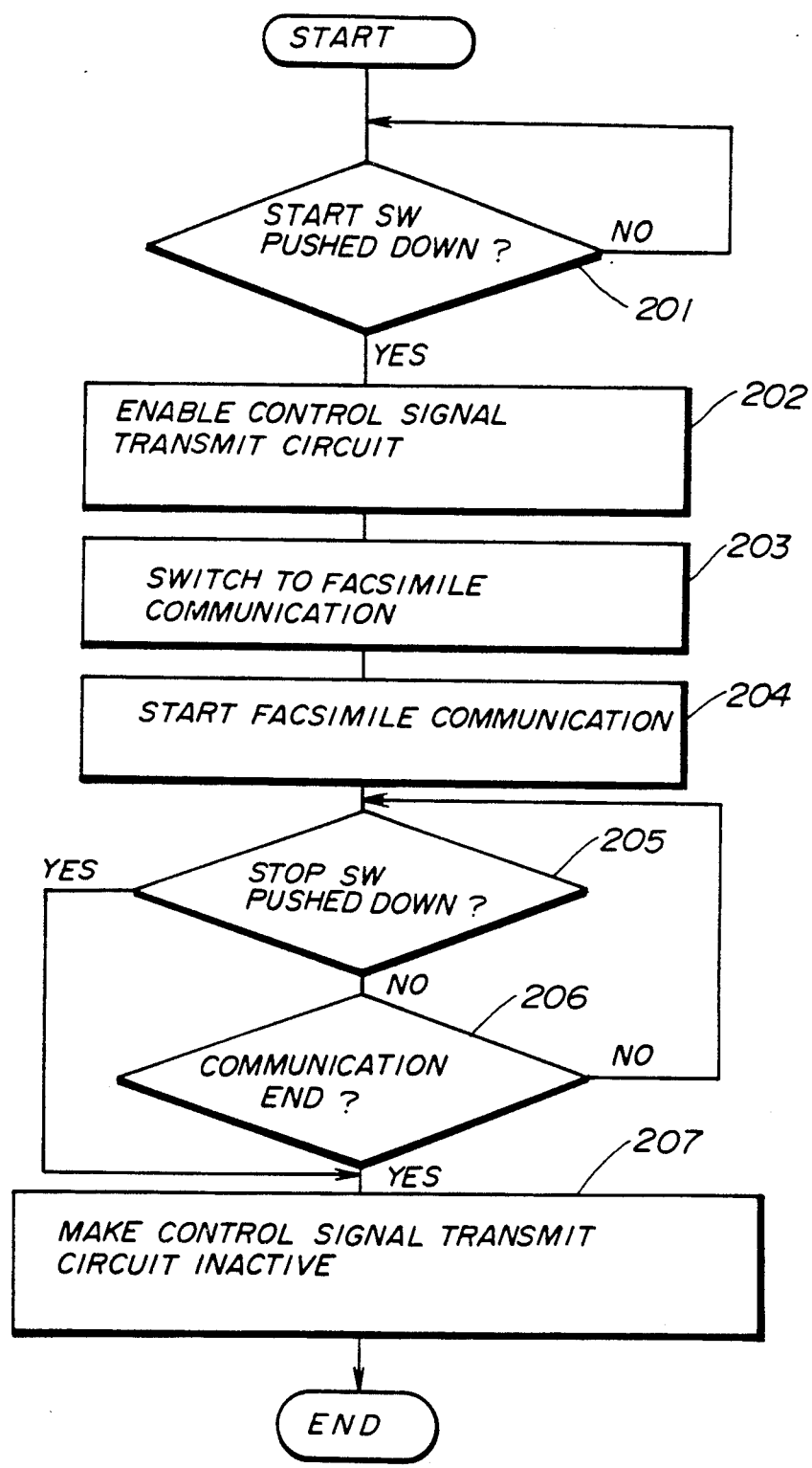

ACOUSTIC COUPLER AND DATA TRANSMISSION APPARATUS USING THE SAME

BACKGROUND OF THE INVENTION

The present invention generally relates to an acoustic coupler and a data transmission apparatus using the acoustic coupler.

Recently, there has been used a facsimile machine in which an acoustic coupler is set to the handset of the telephone set or vice versa so that a facsimile communication using a public telephone line can be easily realized. The acoustic coupler is set to the handset in such a way that a speaker-side portion of the acoustic coupler is coupled to a transmitter part of the handset, and a microphone-side portion of the acoustic coupler is coupled to a receiver part of the handset. In this state, the acoustic coupler is secured to the handset by a band or the like. Rubber packing members are respectively provided on the speaker-side portion and the microphone side-portion of the acoustic coupler so that a signal sound is prevented from leaking out of the acoustic coupler and a background noise is prevented from inputting to the acoustic coupler.

When a facsimile machine sends data on a document to a destination facsimile machine by using the acoustic coupler, an operator calls the destination facsimile machine by dialing and then sets the handset to the acoustic coupler after confirming the sound of a called station identification signal (CED signal). Then, the operator activates the facsimile machine, so that it is connected to the selected telephone line. When the destination facsimile machine sends the CED signal to the source facsimile machine, the fee accounting operation is started. Thus, the operator must set the handset to the acoustic coupler as soon as possible after confirming the CED signal sound. Unless the source facsimile machine responds to the CED signal within 30 seconds, for example, after receiving the CED signal, the destination facsimile machine determines that an error take places and stops the facsimile communication.

However, there are some cases where it takes a long time the operator to set the handset to the acoustic coupler. This occurs frequently, when facsimile communication is carried out by using an automobile telephone. In order to eliminate the above-mentioned problem, it is possible for the operator to set the handset to the acoustic coupler when calling the destination party so that the handset is spaced slightly apart from the acoustic coupler. However, this arrangement prevents the operator from hearing the CED signal sound. In addition, the handset is tightly fastened to the acoustic coupler during facsimile communication. Thus, there is a possibility that the operator does not notice the end of facsimile communication. In this case, the wasteful fee will be charged.

SUMMARY OF THE INVENTION

It is a general object of the present invention to provide an improved acoustic coupler in which the above-mentioned disadvantages are eliminated.

A more specific object of the present invention is to provide an acoustic coupler improving the operator operation when carrying out facsimile transmission by using the acoustic coupler.

Another object of the present invention is to provide a data transmission apparatus using an acoustic coupler.

BRIEF DESCRIPTION OF THE DRAWINGS

Other objects, features and advantages of the present invention will become apparent from the following detailed description when read in conjunction with the accompanying drawings, in which:

FIG. 10 is a flowchart showing the operation of the facsimile machine shown in FIG. 9.

DESCRIPTION OF THE PREFERRED EMBODIMENTS

A description will now be given of the facsimile machine according to the first preferred embodiment of the present invention.

Figure 1:
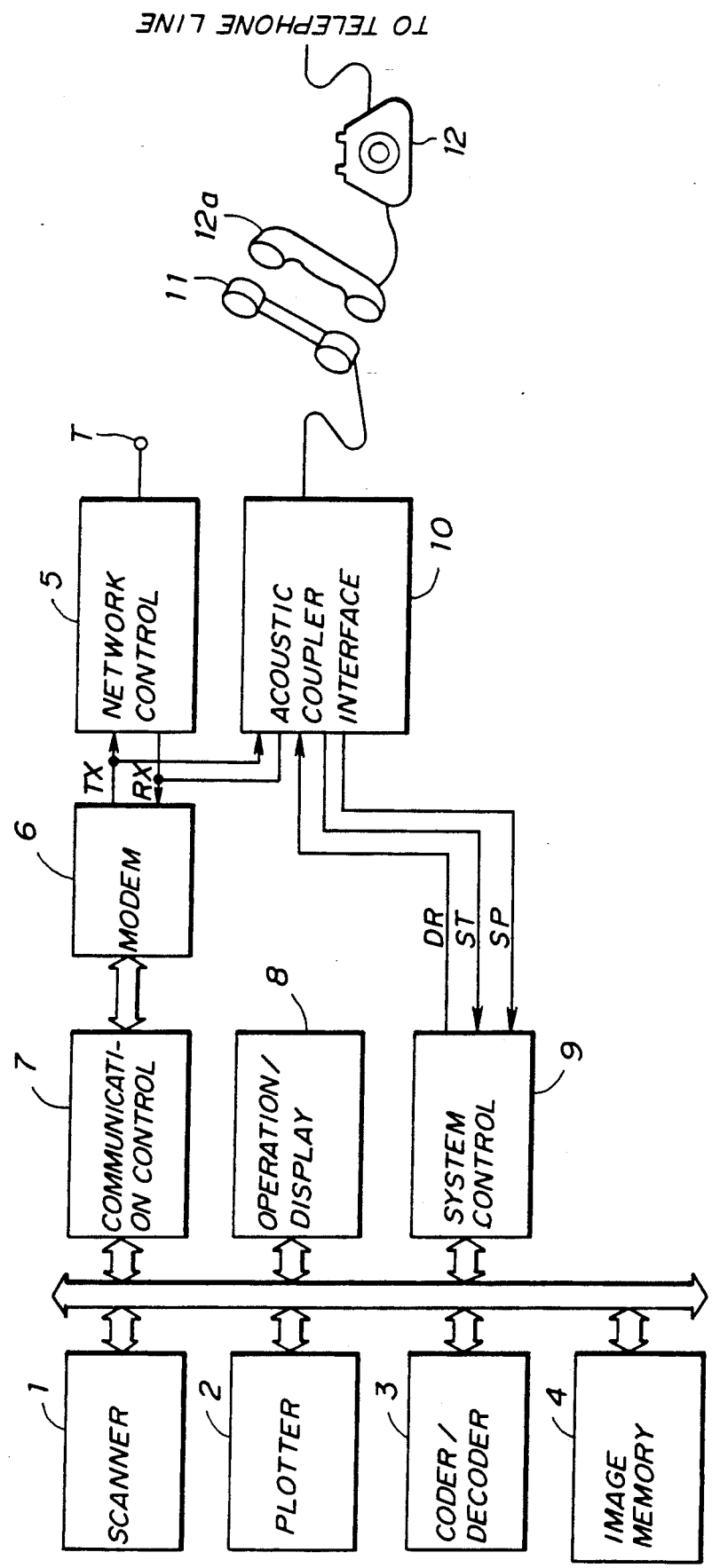
FIG. 1 is a block diagram of a facsimile machine according to a first preferred embodiment of the present invention.

Referring to FIG. 1, a scanner 1 optically reads a document and outputs electrical image information about the document. A plotter 2 records image information on a recording media, such as a sheet of paper. A coder/decoder (codec) 3 encodes image information to be transmitted to generate encoded image information and decodes encoded image information to generate original image information. An image memory 4 temporarily stores image information to be transmitted when the image information is immediately stored therein and thereafter sent.

A network controller 5 carries out a predetermined call establishing (setup) operation and a call receiving operation, as defined by the CCITT recommendations. A modem 6 modulates encoded image information and demodulates modulated encoded image information. A communication controller 7 controls the network controller 5 and the modem 6 so that a facsimile transmission is established in accordance with a predetermined transmission control procedure as defined by the CCITT recommendations. A terminal T is connected to a public telephone line when facsimile communication is carried out without using an acoustic coupler which will be described later.

An operation/display device 8 displays the status of the facsimile machine on a display part thereof, and input various data. A system controller 9 is formed of, for example, a microcomputer, and controls the entire operation of the facsimile machine.

An acoustic coupler interface circuit 10 electrically connects an acoustic coupler 11 to the facsimile machine. A transmit signal TX output by the modem 6 is input to the acoustic coupler interface circuit 10 and the network controller 5. A receive signal RX output by the network controller 5 or the acoustic coupler interface circuit 10 is input to the modem 6. A relay drive signal DR produced and output by the system controller 9 is input to the acoustic coupler interface circuit 10. The relay drive signal DR is used for switching the facsimile machine between a speech mode and a facsimile communication mode. A start signal ST and a step signal which are generated and output by the acoustic coupler interface circuit 9, are input to the system controller 9.

Figure 2:
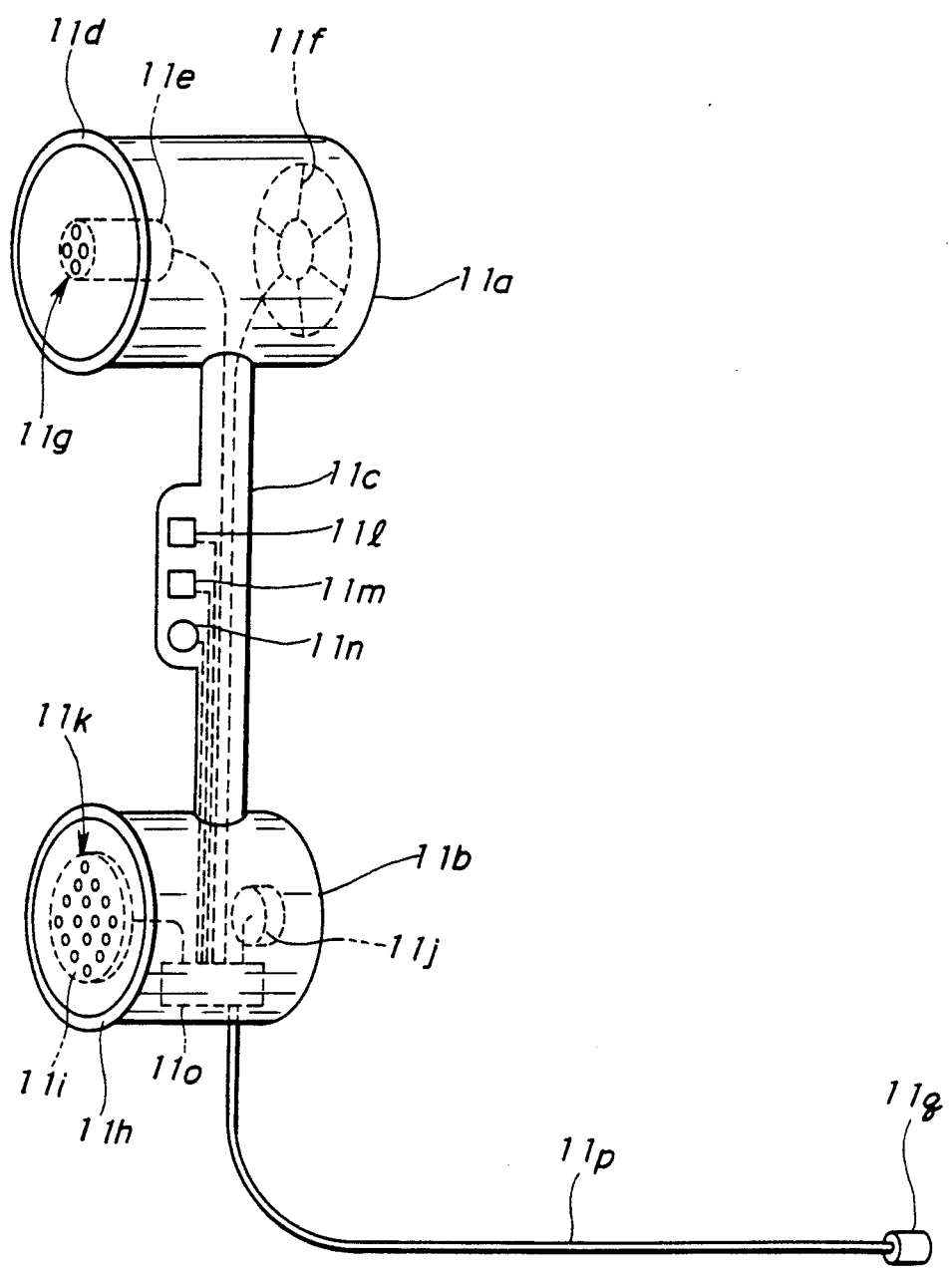
FIG. 2 is a perspective view of the outer appearance of an acoustic coupler used for the facsimile machine shown in FIG. 1.

The acoustic coupler 11 is set to a handset 12a of a general telephone set 12. As is shown in FIG. 2, the acoustic coupler 11 has a receive part (housing) 11a and a transmit part (housing) 11b, both of which are coupled to each other by a coupling member 11c. An end of the receive part 11a is brought in contact with the receiver portion of the handset 12a. A rubber packing member 11d is provided on the end of the receive part 11a along its periphery in order to prevent a gap from being formed between the receive part 11a and the receiver portion of the handset 12a. A condenser microphone 11e is fastened to an inner surface of the end on which the rubber packing member 11d is provided. A speaker 11f is fastened to an inner surface of an opposite end. A plurality of holes 11g which pass sounds are formed in the opposite ends of the receive part 11a.

An end of the transmit part 11b is fastened to the transmitter portion of the handset 12a. A rubber packing member 11h is provided on the end of the transmit part 11b of the acoustic coupler 11 along its periphery in order to prevent a gap from being formed between the end and the transmitter portion of the handset 12a. A speaker 11i is fastened to an inner surface of the end of the transmit part 11b, and a condenser microphone 11j is fastened to an opposite inner surface. A plurality of holes 11k are formed in the opposite ends of the transmit part 11b.

On an outer surface of the coupling member 11c, provided are a start button switch 11l, a stop bottom switch 11m and a volume 11n for adjusting the sound volume of received speech. Signal lines extending from these parts are connected to a connection code 11p through a terminal board 11o. The connection cord 11p is externally drawn and connected to the acoustic coupler interface circuit 10 through a connector 11q.

Figure 3:
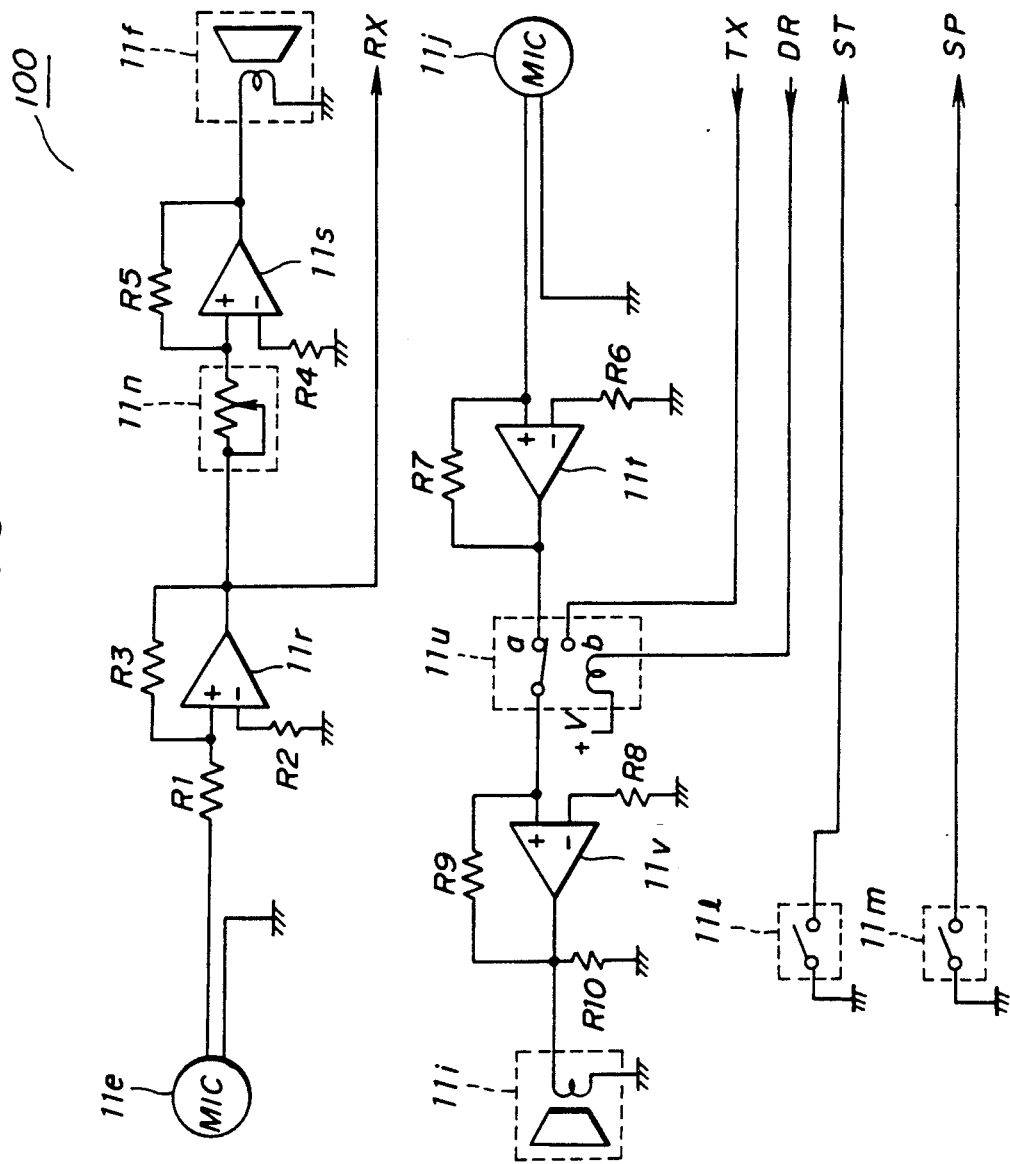
FIG. 3 is a circuit diagram of the acoustic coupler shown in FIG. 2 and an acoustic coupler interface circuit.

FIG. 3 is a circuit diagram of the acoustic coupler interface circuit 10 and the acoustic coupler 11. A coupling circuit 100 is provided in the acoustic coupler 11. Alternatively, the coupling circuit 100 may be provided in the acoustic coupler interface circuit 10. Referring to FIG. 3, one of the two ends of the condenser microphone 11e of the acoustic coupler 11 is grounded and the other end thereof is connected to a non-inverting input terminal of a differential (operational) amplifier 11r via a resistor R1. An inverting input terminal of the differential amplifier 11r is grounded via a resistor R2, and a resistor R3 is connected between the non-inverting input terminal of the differential amplifier 11r and an output terminal thereof. The differential amplifier 11r functions as a non-inverting amplifier circuit. The aforementioned receive signal RX is drawn from the output terminal of the differential amplifier 11r and then input to the modem 6.

The output terminal of the differential amplifier 11r is connected to a non-inverting input terminal of a differential amplifier 11s via a volume 11n formed of a variable resistor. An inverting input terminal of the differential amplifier 11s is grounded through a resistor R4. A resistor R5 is connected between the non-inverting input terminal of the differential amplifier 11s and the output terminal thereof. The differential amplifier 11s functions as a non-inverting amplifier circuit. The output terminal of the differential amplifier 11s is connected to one of the two ends of the speaker 11f of the acoustic coupling 11, and the other end thereof is grounded.

One of the two ends of the condenser microphone 11j of the acoustic coupler 11 is grounded, and the other end thereof is connected to a non-inverting input terminal of a differential amplifier 11t. An inverting input terminal of the differential amplifier 11t is grounded through a resistor R6. A resistor R7 is connected between the non-inverting input terminal of the differential amplifier 11t and the output terminal thereof. The output terminal of the differential amplifier 11t is connected to a break-side contact a of a relay 11u. A common terminal of the relay 11u is connected to a non-inverting input terminal of a differential amplifier 11v. An inverting input terminal of the differential amplifier 11v is grounded through a resistor R8. A resistor R9 is connected between the non-inverting input terminal of the differential amplifier 11v and the output terminal thereof. The differential amplifier 11v functions as a non-inverting amplifier circuit. The output terminal of the differential amplifier 11v is grounded through a resistor R10 and is also connected to one of the two ends of the speaker 11i. The other end of the speaker 11i is grounded.

A make-side contact b of the relay 11u is connected to a signal line on which the transmission signal TX output by the modem 6 is carried. A coil of the relay 11u has an end connected to a signal line on which the relay drive signal DR from the system controller 9 (FIG. 1) is carried, and an end supplied with a power supply line which carries a positive power source voltage. One of the two ends of the start button 11l is connected to the system controller 9 and the other end thereof is grounded. Similarly, one of the two ends of the stop button 11m is connected to the system controller 9 and the other end thereof is grounded.

Figure 4:
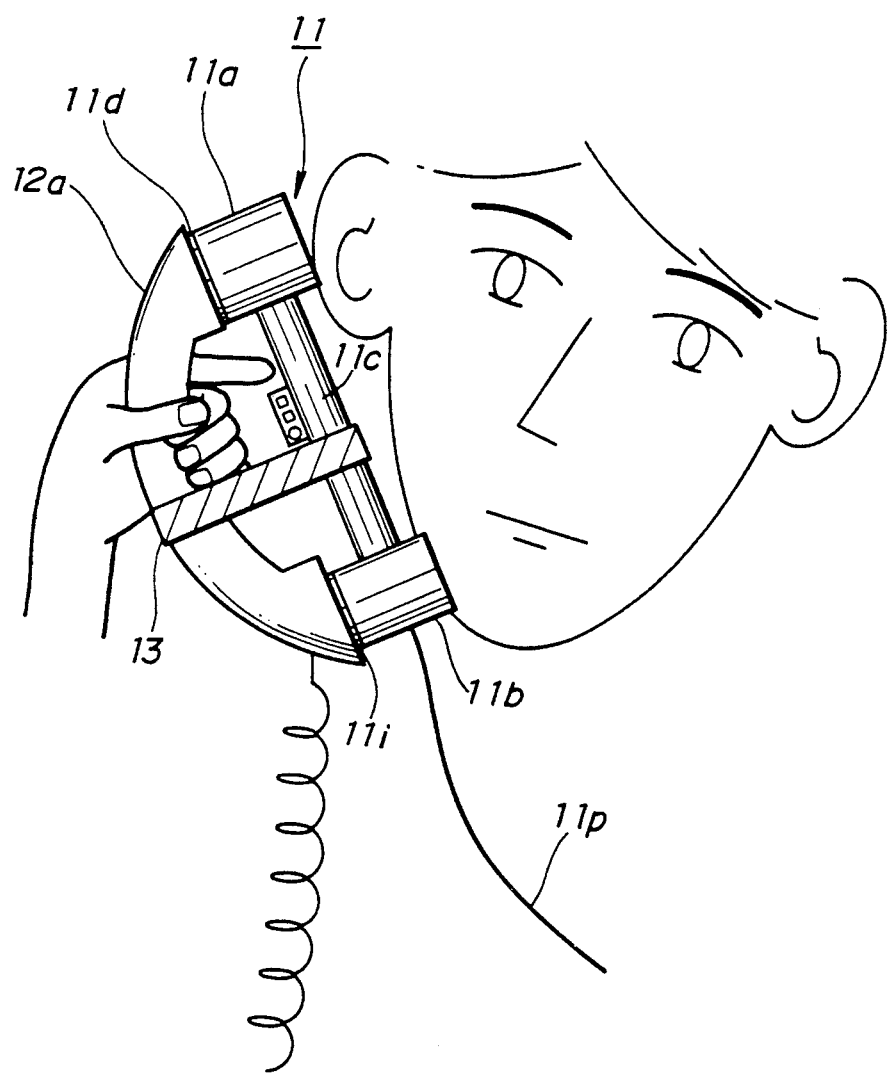
FIG. 4 is a diagram illustrating how to set the acoustic coupler shown in FIG. 2 to a handset and use the same.

A description will now be given of the operation of the facsimile machine realized by using the acoustic coupler 11. It is now assumed that information about a document is transmitted. The document is set in the scanner 1 (FIG. 1). The telephone set 12 is switched to the off-hook state. As shown in FIG. 4, the acoustic coupler 11 is set to the handset 12a and fastened thereto by means of a band 13. Then, the operator dials a desired telephone number.

The operator hears the dial tone output by the receiver of the handset 12a before dialing. The dial tone output by the receiver of the handset 12a is converted into a corresponding electrical signal by the condenser microphone 11e of the acoustic coupler 11. The electrical signal is successively amplified by the differential amplifiers 11r and 11s, and is output to the speaker 11f. It is possible to adjust the volume of dial tone by the volume 11n on the coupling member 11c. During the above-mentioned operation, the facsimile machine is not activated and the common contact of the relay 11u is connected to the break-side contact a. Thus, sound input to the microphone 11j is converted into an electrical signal, which is then amplified by the differential amplifiers 11t and 11v. Then, the sound is output to the speaker 11i and transferred to the receiver of the handset 12a. By the above-mentioned operation, it is possible for the operator to hear the received sound output transmitted on the telephone line from the speaker 11f and talk with an operator on the destination side through the microphone 11j.

If the operator on the destination side answers the call, the operator on the source side informs the operator on the destination side that there is a document to be transmitted. In response to this notice, the destination facsimile machine is activated and sends back a predetermined facsimile signal, such as the CED signal to the source facsimile machine. Upon hearing the tone of the received CED signal, the operator on the source side pushes down the start button 11l (FIG. 2).

Figure 5:
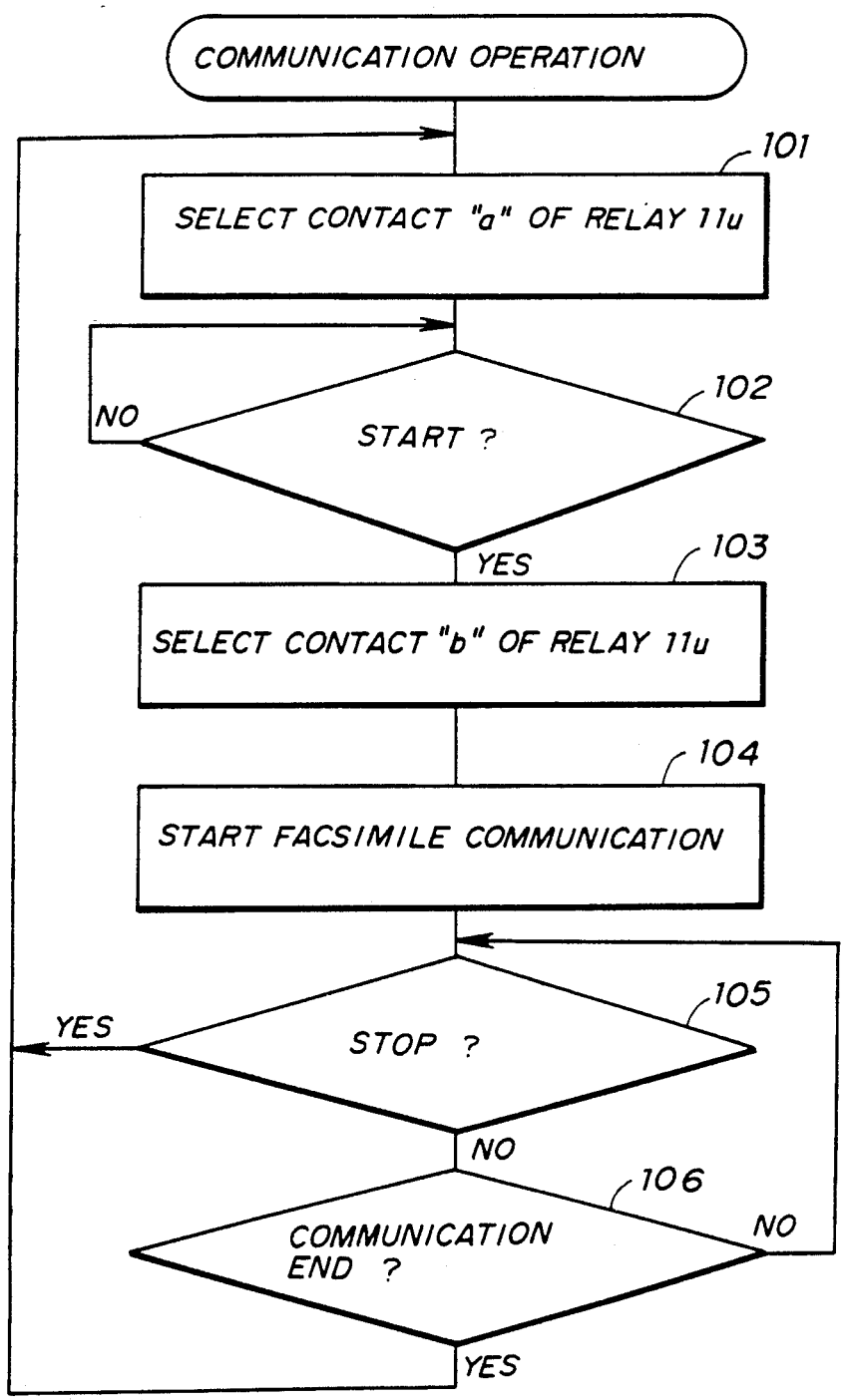
FIG. 5 is a flowchart of a communication operation of the facsimile machine shown in FIG. 1.

As shown in FIG. 5, the relay 11u selects the break-side contact a (at step 101) before the start button 11l is pushed down. When the start bottom 11l is pushed down (step 102), the system controller 9 outputs the relay drive signal DR in response to the start signal ST so that the relay 11u selects the make-side contact b (step 103). The received facsimile signal, such as the CED signal, is input, as the receive signal RX, to the modem 6 through the condenser microphone 11e and the differential amplifier 11r. On the other hand, the transmit signal from the modem 6 is applied to the transmitter of the handset 12a through the relay 11u, the differential amplifier 11v and the speaker 11i, and is then sent to the facsimile machine on the destination side. Then, the facsimile machine on the source side starts the facsimile communication (step 104). Image information read by the scanner 1 (FIG. 1) is transmitted to the destination facsimile machine in accordance with the predetermined transmission control procedure as defined by the CCITT recommendations.

After starting the facsimile communication, the source facsimile machine monitors the operation of the stop button 11m and the completion of the facsimile machine (steps 105 and 106). When the result at step 105 or step 106 becomes YES, the control procedure shown in FIG. 5 returns to step 101.

It will be noted that the operator can hear the tone signal output by the receiver of the handset 12a through the speaker 11f, and easily determine whether or not the facsimile communication is being executed. The operator returns the operation to the speech mode or sets the handset 12a to the off-hook state.

If a communication error takes place during the time that the facsimile communication is being executed, or the operator wishes to stop the facsimile communication, the operator pushes down the stop button 11m. When the stop button 11m is operated (step 105), the control process returns to step 101.

It is now assumed that the facsimile machine shown in FIG. 1 receives information about a transmission document. In this case, the destination facsimile machine is informed that information about the transmission document will be started. The operator on the destination side sets the acoustic coupler 11 to the handset 12a, and pushes down the start button 11l. Then the facsimile communication is carried out in the same way as described previously.

As has been described, the operator can monitor the signal sound or speech in the state where the acoustic coupler 11 is set in the handset 12a. As a result, it is unnecessary for the operator to set the acoustic coupler to the handset rapidly after receiving the CED signal sound. In addition, it is possible for the operator to perform the start/stop operation of facsimile communication without any difficulty since the start button 11l and the stop button 11m are provided to the acoustic coupler itself.

Figure 6:
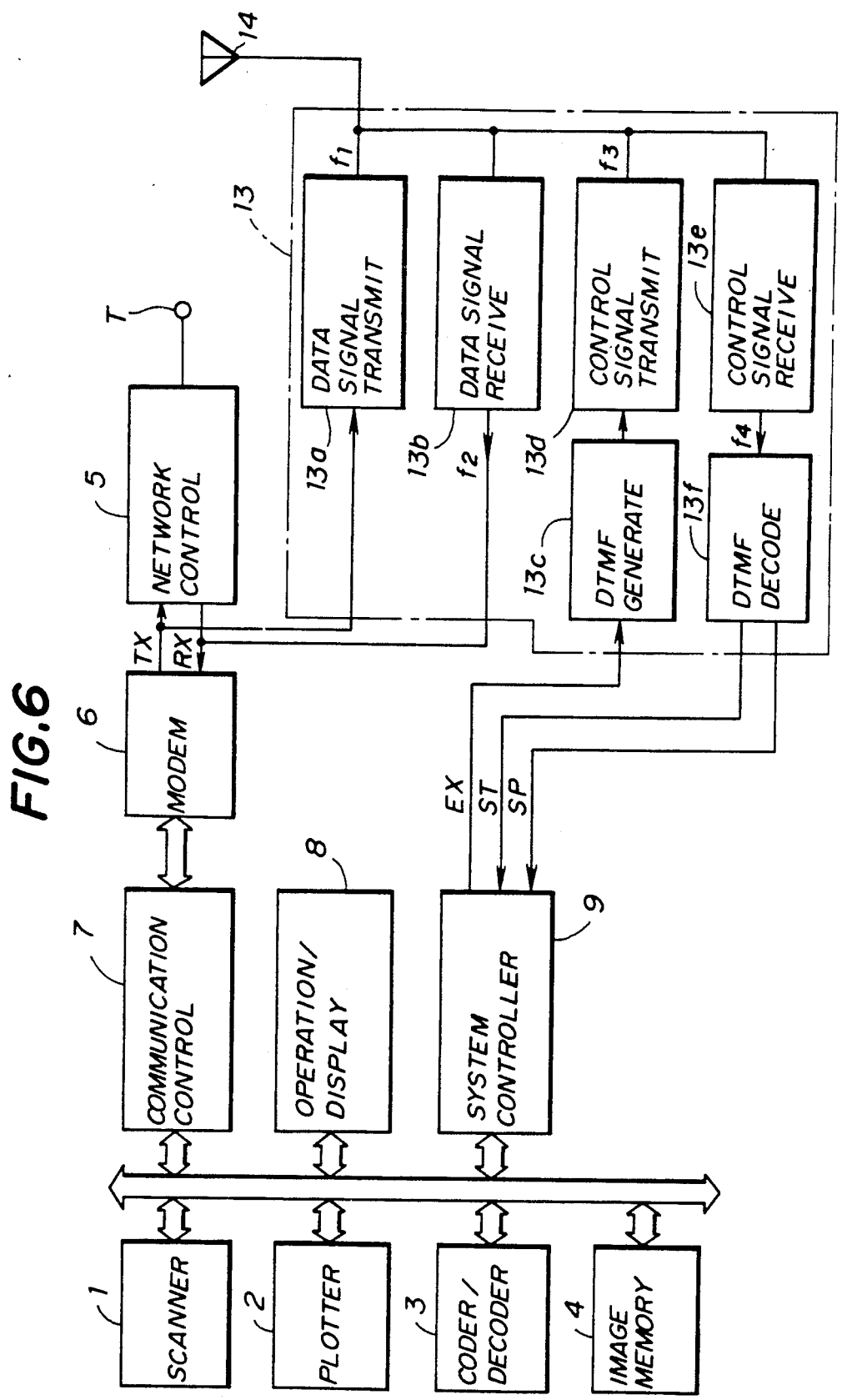
FIG. 6 is a block diagram of a facsimile machine according to a second preferred embodiment of the present invention.

A description will now be given of the facsimile machine according to the second preferred embodiment of the present invention with reference to FIG. 6. In FIG. 6, those parts which are the same as those shown in the previous figures are given the same reference numerals. The facsimile machine shown in FIG. 6 is different from that shown in FIG. 1 in that an acoustic coupler radio interface circuit 13 is substituted for the acoustic coupler interface circuit 10 shown in FIG. 1.

The acoustic coupler radio interface circuit 13 is composed of a data signal transmit circuit 13a, a data signal receive circuit 13b, a DTMF (Dual Tone Multi-Frequency) signal generator 13c, a control signal transmit circuit 13d, a control signal receive circuit 13e and a DTMF signal decode circuit 13f.

The data signal transmit circuit 13a modulates the transmit signal TX and generates a high-frequency signal having a frequency $f_1$, which is radiated, as a radio wave, through an antenna 14. The data signal receive circuit 13b demodulates a received radio wave and generates a high-frequency signal having a frequency $f_2$ from the received radio wave. The high-frequency signal $f_2$ is, as the receive signal RX, input to the modem 6.

The DTMF signal generator 13c inputs a speech/facsimile communication switching signal EX which is produced and output by the system controller 9, and converts the binary status of the switching signal EX into a DTMF signal. The speech/facsimile communication switching signal EX indicates whether the facsimile machine being considered is in the speech mode or the facsimile communication mode.

The control signal transmit circuit 13d modulates the DTMF signal and generates a high-frequency signal having a frequency $f_3$, which is radiated, as a radio wave, through the antenna 14.

The control signal receive circuit 13e demodulates the radio wave signal and generates a high-frequency signal having a frequency $f_4$ from the received radio wave. The DTMF signal decoder 13f decodes the high-frequency signal $f_4$ and derives the aforementioned start signal ST and the stop signal SP therefrom, each of which is a binary signal.

Figure 7:
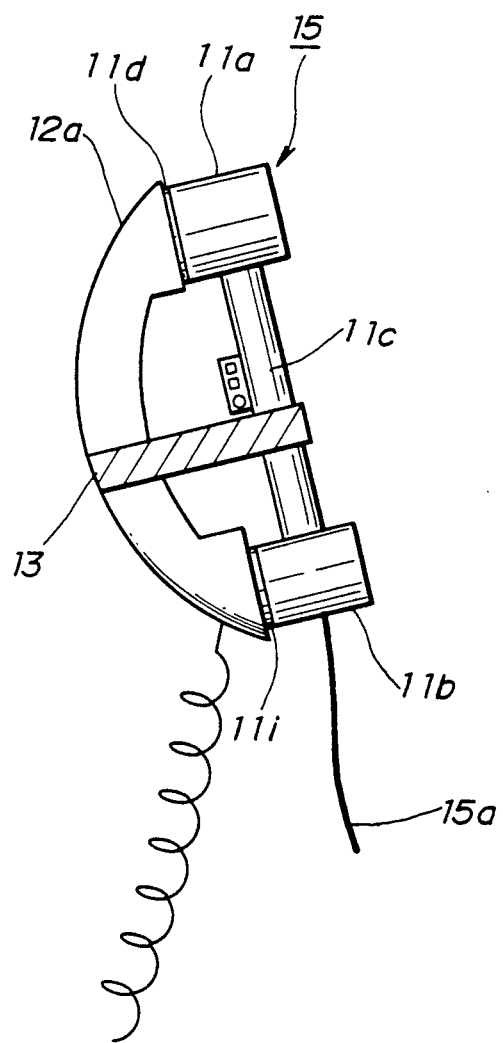
FIG. 7 is a diagram illustrating how to set the acoustic coupler used for the facsimile machine shown in FIG. 6 to the handset.

Referring to FIG. 7, an acoustic coupler 15 is coupled to the hand set 12a. The acoustic coupler 15 is of a shape which is almost identical to that of the acoustic coupler 11 shown in FIG. 4.

Figure 8:
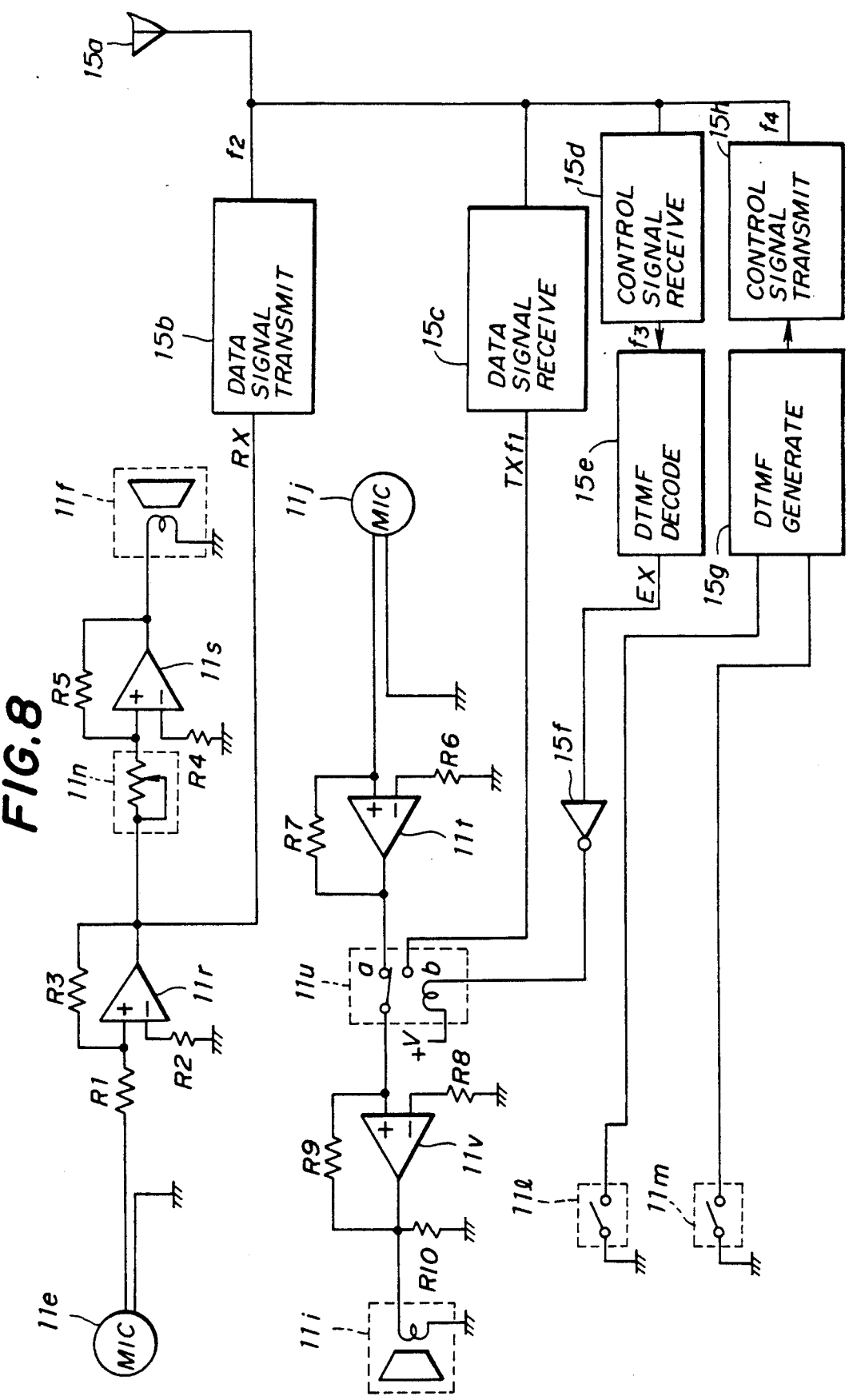
FIG. 8 is a circuit diagram of the acoustic coupler used for the facsimile machine shown in FIG. 6.

FIG. 8 is a circuit diagram of the acoustic coupler 15. In FIG. 8, those parts which are the same as those shown in FIG. 3 are given the same reference numerals. The acoustic coupler 15 shown in FIG. 8 has a coupling circuit 200, which includes a data signal transmit circuit 15v, a data signal receive circuit 15c, a control signal receive circuit 15d, a DTMF signal decoder 15e, a DTMF signal generator 15g, a control signal transmit circuit 15h and a relay driver 15f. The data signal transmit circuit 15b modulates the receive signal output from the differential amplifier 11r and generates a high-frequency signal having the frequency $f_2$, which is radiated through an antenna 15a, such as a wire antenna. The data signal receive circuit 15c demodulates a received radio wave and generates the transmit signal TX, which is applied to the make-side contact b of the relay 11u.

The control signal receive circuit 15d demodulates the received radio wave and generates a high-frequency signal having the frequency $f_3$. The DTMF signal decoder 15e converts the DTMF signal into the binary speech/facsimile communication switching signal EX. The switching signal EX is input to the relay driver 15f, the output of which is connected to the coil of the relay 11u.

The DTMF signal generator 15g inputs the signals output by the start switch 11l and the stop switch 11m, and generates the DTMF signal on the basis of the binary states of these signals. The control signal transmit circuit 15h modulates the DTMF signal and generates a high-frequency signal of the frequency $f_4$, which is radiated through the antenna 15a.

The facsimile machine shown in FIG. 6 using the acoustic coupler in FIGS. 7 and 8 operates as follows. It is now assumed that information about a document is transmitted. The document is set in the scanner 1. The telephone set 12 is switched to the off-hook state. The acoustic coupler 11 is set to the handset 12a and fastened thereto by means of the band 13. Then, the operator dials a desired telephone number.

The operator hears the dial tone output by the receiver of the handset 12a before dialing. The dial tone output by the receiver of the handset 12a is converted into a corresponding electrical signal through the condenser microphone 11e. The electrical signal is successively amplified by the differential amplifiers 11r and 11s, and is then output to the speaker 11f. It is possible to adjust the volume of dial tone by the volume 11n. During the above-mentioned operation, the facsimile machine is not activated and the common contact of the relay 11u is connected to the break-side contact a. Thus, sound input to the microphone 11j is converted into an electrical signal, which is then amplified by the differential amplifiers 11t and 11v. Then, the sound is output to the speaker 11i and transferred to the receiver of the handset 12a. By the above-mentioned operation, it is possible for the operator to hear the received sound output on the telephone line from the speaker 11f and talk with an operator on the destination side through the microphone 11j.

If the operator on the destination side answers the call, the operator on the source side informs the operator on the destination side that there is a document to be transmitted. In response to this notice, the destination facsimile machine is activated and sends back a predetermined facsimile signal, such as the CED signal to the source facsimile machine. Upon hearing the received CED signal sound, the operator on the source side pushes down the start button 11l.

When the start button is pushed down, the signal from the start button 11l is converted into the DTMF signal by the DTMF signal generator 15g. The DTMF signal produced and output by the DTMF signal generator 15g is converted into the high-frequency signal of the frequency $f_4$ by the control signal transmit circuit 15h, and is then radiated through the antenna 15a. The radiated radio wave is received by the control signal receive circuit 13e of the facsimile machine (FIG. 6), which generates high-frequency signal $f_4$. The DTMF signal decoder 13f generates the start signal ST from the high-frequency signal $f_4$ and then input to the system controller 9.

The system controller 9 sets the speech/facsimile communication switching signal EX to the facsimile communication state. This switching signal EX is converted into the radio wave having the frequency $f_3$ by the DTMF signal generator 13c and the control signal transmit circuit 13d, and is then radiated through the antenna 14. The radiated radio wave is received by the control signal receive circuit 15d of the acoustic coupler 15, which generates the signal $f_3$. The DTMF signal decoder 15e generates the speech/facsimile communication switching signal EX from the signal $f_3$. The switching signal EX is applied to the coil of the relay 11u through the relay driver 15f so that the relay 11u selects its make-side contact b.

After that, the facsimile signal received from the destination facsimile machine is input, as the receive signal RX, to the data signal transmit circuit 15b. The data signal transmit circuit 15b modulates the receive signal RX and produces the radio wave having the frequency $f_2$, which is then radiated through the antenna 15a. The radiated radio wave is received and demodulated to the receive signal RX by the data receive circuit 13b of the facsimile machine (FIG. 6). The demodulated receive signal RX is input to the modem 6.

On the other hand, the transmit signal from the modem 6 is modulated by the data signal receive circuit 13b so that the radio wave having the frequency $f_1$ is produced. The radio wave is converted to the transmit signal TX by the demodulation procedure by the data signal receive circuit 15c of the acoustic coupler 15 (FIG. 8), and is then input to the differential amplifier 11v. Thereby, the transmit signal TX is transmitted to the other party. By the above-mentioned manner, the facsimile machine realizes the facsimile communication.

If the operator pushes down the stop button 11m during the facsimile communication, the contact signal produced and output by the stop button 11m is sent, as the stop signal SP, to the system controller 9 of the facsimile machine in the aforementioned way. The system controller 9 stops the facsimile communication immediately after receiving the stop signal SP. It should be appreciated that according to the second embodiment of the present invention, the facsimile machine communicates with the acoustic coupler 15 by radio transmission. Thus, it is unnecessary to use the coupling wire between the facsimile machine and the acoustic coupler, so that the switch operation is improved. With this arrangement, it becomes possible for the operator to speak with the operator on the other party in the state where the operator places the facsimile machine at any positions apart from the acoustic coupler 15 set to the handset 12a of the telephone set. Further, it is possible to automatically switch the facsimile machine between the speech mode and the facsimile communication mode by means of the relay 11u responsive to the speech/facsimile communication switching signal EX.

The frequencies $f_1$ and $f_2$ of the transmit signals are selected between 40–45 MHz, for example, and the frequencies $f_3$ and $f_4$ of the receive signals are selected between 46–49 MHz, for example. Of course, the frequency ranges are not limited to the above frequency ranges.

Figure 9:
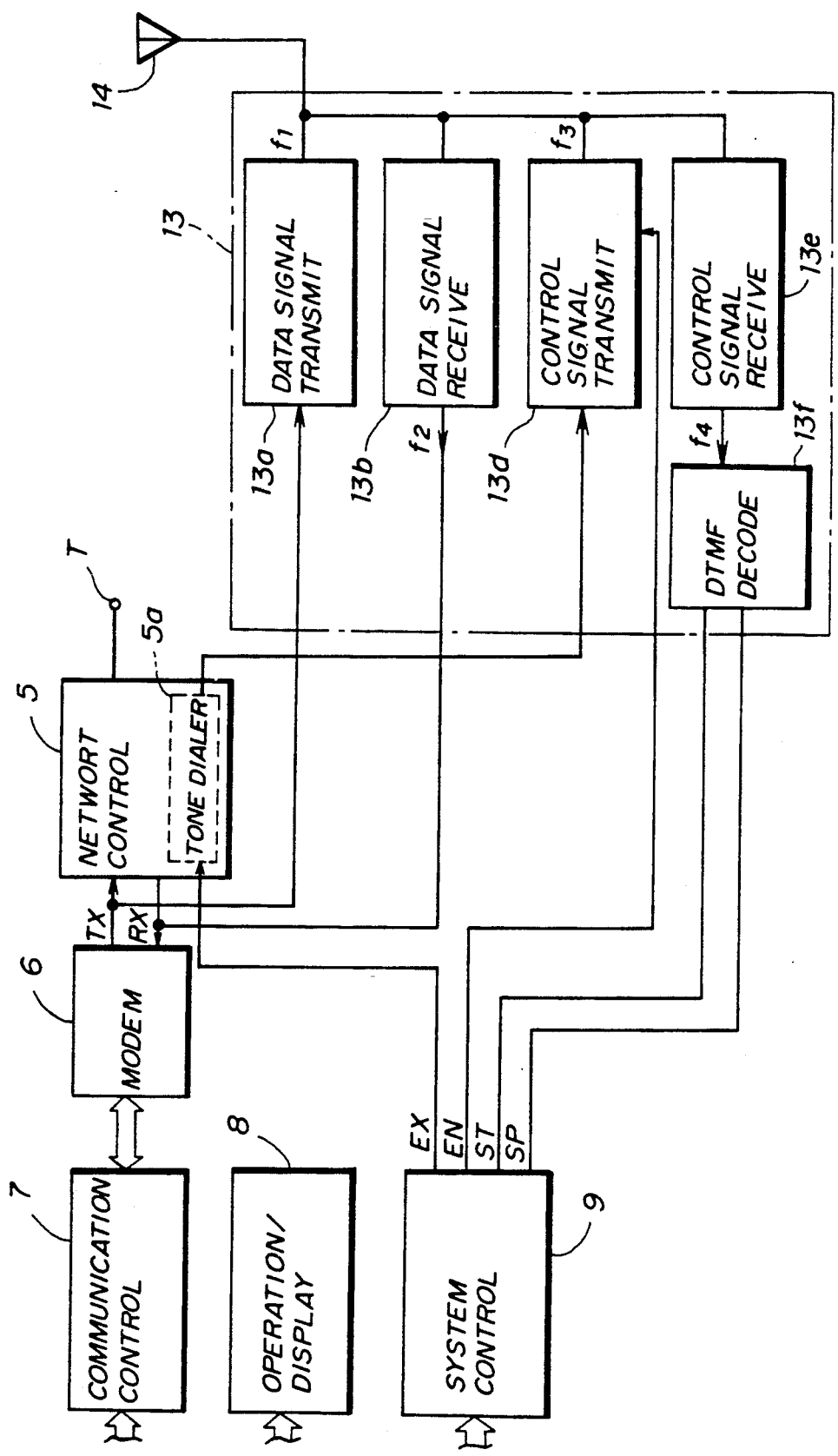
FIG. 9 is a block diagram of a facsimile machine according to a third preferred embodiment of the present invention.

A description will now be given of the facsimile machine with the acoustic coupler according to the third preferred embodiment of the preset invention with reference to FIG. 9. In FIG. 9, those parts which are the same as those shown in FIG. 6 are given the same reference numerals. Referring to FIG. 9, the speech/facsimile communication switching signal EX output by the system controller 9 is input to a tone dialer 5a provided in the network controller 5. The tone dialer 5a outputs the DTMF signal which is the dial signal when the network controller 5 is connected to the public telephone line. The DTMF signal generated and output by the tone dialer 5a is applied to the control signal transmit circuit 13d. The system controller 9 supplies the control signal transmit circuit 13d with an enable signal EN, which activates the control signal transmit circuit 13d when necessary. The other circuits of the facsimile machine and the acoustic coupler used together with the facsimile machine are identical to those according to the second embodiment of the present invention. During the time when the facsimile machine is not executing the facsimile communication, the system controller 9 maintains the control signal transmit circuit 13d in the inactive state.

Referring to FIG. 10, when the operator pushes down the start switch 11l (step 201), the start signal ST is applied to the system controller 9. The system controller 9 activates the control signal transmit circuit 13d (step 202) in response to the start signal ST. Thereby, the speech/facsimile communication switching signal EX is converted into the DTMF signal by the tone dialer 5a. Then, the DTMF signal is converted into the radio wave by the control signal transmit circuit 13d and then transmitted to the acoustic coupler 15.

The system controller 9 switches the facsimile machine to the facsimile communication mode in response to the speech/facsimile communication switching signal EX (step 203), and realizes the facsimile communication in the same way as in the second embodiment of the present invention (step 204). After that, when the operator pushes down the stop switch 11m (step 205) or the facsimile communication ends (step 206), the system controller 9 makes the control signal transmit circuit 13d inactive (step 207).

According to the third embodiment of the present invention, the speech/facsimile communication switching signal EX is converted into the DTMF signal by means of the tone dialer 5a provided in the network controller 5. With this arrangement, it is unnecessary to provide the DTMF signal generator in the acoustic coupler radio interface circuit 13 and thus reduce the cost.

In the case where the facsimile communication is executed by using the acoustic coupler 15, it is unnecessary to dialing the source telephone number. It will be noted that there is a possibility that the operator pushes down the dial key (not shown) mistakenly. If the dial key is pushed down, the DTMF signal is output from the tone dialer 5a. In this case, the control signal transmit circuit 13d shown in FIG. 9 is activated by the enable signal EN during only the time when the communication is being executed. Thus, even if the operator operates the dial key mistakenly during the speech communication, it is possible to prevent the relay 11u from being switched so that the speech communication becomes impossible.

In each of the first, second and third embodiments of the present invention, the operator brings the speaker 11f of the acoustic controller 11 in contact with his/her ear and monitors the signal sound. However, if the speaker 11f is adjusted so as to output an increased sound volume, it is possible for the operator to hear the signal sound without bringing the same in contact with the ear. It is also possible to monitor not only the receive signal but also the transmit signal by using the speaker 11f.

The present invention is described by referring to the facsimile machines using the acoustic couplers. However, the present invention can be applied to a variety of data transmission apparatus which uses an acoustic coupler.

In each of the second and third embodiments of the present invention, four radio wave frequencies $f_1$, $f_2$, $f_3$ and $f_4$ are used. Alternatively, it is possible to mix the control signal and data signal so that the various signals are transmitted by using two radio wave frequencies.

The present invention is not limited to the specifically disclosed embodiments, and variations and modifications may be made without departing from the scope of the present invention.

What is claimed is:

1. An acoustic coupler comprising:
   a receive part housing having a first end and a second end;
   a transmit part housing having a first end and a second end;
   a coupling member mechanically coupling said receive part housing and said transmit part housing;
   a first microphone fastened to the first end of said receive part and receiving an acoustic signal from a transmitter portion of a handset of a telephone when said acoustic coupler is set to said handset;
   a first speaker fastened to the second end of said receive part and outputting an acoustic signal to an operator;
   a second speaker fastened to the first end of said transmit part and outputting an acoustic signal to a receiver portion of the handset;
   a second microphone fastened to the second end of said transmit part and inputting an acoustic signal from the operator; and
   coupling means for electrically coupling said first microphone, said second microphone, said first speaker and said second speaker to a data transmission apparatus.

2. An acoustic coupler as claimed in claim 1, wherein said coupling means comprises radio communication means for coupling said first microphone, said second microphone, said first speaker and said second speaker to the data transmission apparatus by radio waves.

3. An acoustic coupler as claimed in claim 1, wherein said coupling means comprises wires which couples said first microphone, said second microphone, said first speaker and said second speaker to the data transmission apparatus.

4. An acoustic coupler as claimed in claim 1, further comprising switching means for receiving a signal output from said second microphone and a transmit signal supplied from said data transmission apparatus and for outputting either one of said signal output or said transmit signal to said second speaker.

5. An acoustic coupler as claimed in claim 4, wherein said switching means includes a control terminal to which a switching signal generated and output by said data transmission apparatus is applied.

6. An acoustic coupler as claimed in claim 1, further comprising a start switch which generates a start signal which activates an operation of said data transmission apparatus, wherein said start switch is provided on said coupling member.

7. An acoustic coupler as claimed in claim 1, further comprising a stop switch which generates a stop signal which stops an operation of said data transmission apparatus, wherein said stop switch is provided on said coupling member.

8. An acoustic coupler as claimed in claim 1, further comprising amplifier means for amplifying a signal from said first microphone and for applying an amplified signal to said first speaker.

9. An acoustic coupler as claimed in claim 2, wherein said radio communication means comprises:
   data transmit means for converting a signal supplied from said first microphone into a transmit radio wave which is one of said radio waves and which is transmitted to said data transmission apparatus; and
   data receive means for converting a receive radio wave which is received from said data transmission apparatus and which is one of said radio waves into a signal which is input to said second speaker.

10. An acoustic coupler as claimed in claim 9, wherein said radio communication means comprises switching means for receiving the signal from said microphone and the signal from said data receive means and for outputting one of the signals to said second speaker means.

11. An acoustic coupler as claimed in claim 10, wherein:
   said data communication means comprises control signal receive means for generating a switching signal from a second receive radio wave which is one of said radio waves; and
   said switching means includes a control terminal to which said switching signal is applied.

12. An acoustic coupler as claimed in claim 11, wherein:
   said acoustic coupler comprises a start switch which generates a start signal which activates an operation of said data transmission apparatus and a stop switch which generates a stop signal which stops the operation of said data transmission apparatus; and
   said radio communication means comprises control signal transmit means for generating a second transmit radio wave which is one of said radio waves from said start signal and said stop signal.

13. An acoustic coupler as claimed in claim 11, wherein said data communication means comprises means for generating a control signal from said second receive radio wave and for converting said control signal into said switching signal.

14. An acoustic coupler as claimed in claim 12, wherein said radio communication means comprises means for generating a dual tone multi-frequency signal from said start signal and said stop signal and for converting said dual tone multi-frequency signal into said second transmit radio wave.

15. An acoustic coupler as claimed in claim 1, wherein the first end of said receive part is opposite to the second end of said receive part, and the first end of said transmit part is opposite to the second end of said transmit part.

16. An acoustic coupler as claimed in claim 1, further comprising volume means for adjusting a sound volume of the acoustic signal output by said first speaker.

17. An acoustic coupler as claimed in claim 12, wherein said start switch and said stop switch are fastened to said coupling member.

18. An acoustic coupler as claimed in claim 4, wherein said switching means comprises a relay.

19. An acoustic coupler as claimed in claim 1, wherein said data transmission apparatus is a facsimile machine.

20. A data transmission apparatus comprising:
   data processing means for carrying out a predetermined data processing for data;
   modem means for modulating said data to generate an acoustic transmit signal and for demodulating a receive signal to generate original data;
   an acoustic coupler set to a handset of a telephone set; and
   interface means for electrically coupling said modem means and said acoustic coupler,
   wherein said acoustic coupler comprises:
   a receive part housing having a first end and a second end;
   a transmit part housing having a first end and a second end;
   a coupling member mechanically coupling said receive part housing and said transmit part housing;
   a first microphone fastened to the first end of said receive part and receiving an acoustic signal from a transmitter portion of the handset of the telephone when said acoustic coupler is set to said handset;
   a first speaker fastened to the second end of said receive part and outputting an acoustic signal to an operator;
   a second speaker fastened to the first end of said transmit part and outputting an acoustic signal to a receiver portion of the handset;
   a second microphone fastened to the second end of said transmit part and inputting an acoustic signal from the operator; and
   coupling means for electrically coupling said first microphone, said second microphone, said first speaker and said second speaker to said interface means.

21. A data transmission apparatus as claimed in claim 20, wherein:
   said acoustic coupler comprises data transmit means for converting a signal output by said first microphone into a first radio wave, and data receive means for converting a second radio wave into an acoustic signal which is to be applied to said second speaker; and
   said interface means comprises data transmit means for converting said acoustic transmit signal supplied from said modem into said second radio wave, and data receive means for converting said first radio wave into said receive signal which is supplied to said modem.

22. A data transmission apparatus as claimed in claim 20, wherein said acoustic coupler comprises switching means for receiving a signal output from said second microphone and said acoustic transmit signal supplied from said modem and for outputting either one of said signal output or said acoustic transmit signal to said second speaker.

23. A data transmission apparatus as claimed in claim 21, wherein said acoustic coupler comprises switching means for receiving a signal output from said second microphone and said acoustic signal supplied from said data receive means of said acoustic coupler and for outputting either one of said signal output or said acoustic signal.

24. A data transmission apparatus as claimed in claim 20, wherein said acoustic coupler comprises:

a start switch which generates a start signal which activates an operation of said data transmission apparatus; and a stop switch which generates a stop signal which stops the operation of said data transmission apparatus.

25. A data transmission apparatus as claimed in claim 22, wherein:

said data processing means comprises means for generating a switching signal; and said acoustic coupler comprises a control terminal to which said switching signal generated by said means of said data processing means is applied through said coupling means and said interface means.

26. A data transmission apparatus as claimed in claim 24, wherein:

said data processing means comprises means for generating a switching signal;

said interface means comprises means for converting said switching signal into a radio wave;

said coupling means comprises means for converting said radio wave from said means of the interface means into said switching signal; and said switching means comprises a control terminal to which said switching signal generated by said means of said coupling means is applied.

27. A data transmission apparatus as claimed in claim 26, wherein said radio wave signal generated by said means of the interface means comprises a dual tone multi-frequency signal.

28. A data transmission apparatus as claimed in claim 24, wherein said acoustic coupler comprises control signal transmit means for converting said start signal and said stop signal into a radio wave; and said interface means comprises control signal receive means for converting said radio wave from said control signal transmit means into said start signal and said stop signal which are to be applied to said data processing means.

29. A data transmission apparatus as claimed in claim 28, wherein said radio wave comprises a dual tone multi-frequency signal.

30. A data transmission apparatus as claimed in claim 26, further comprising a tone dialer means for converting said switching signal supplied from said data processing means into said dual tone multi-frequency signal.

31. A data transmission apparatus as claimed in claim 26, further comprising means for allowing said means of the interface means to convert said switching signal into the radio wave only when said data transmission apparatus is executing a data transmission operation.

* * * * *